US011230386B2

(12) United States Patent
Marcel et al.

(10) Patent No.: US 11,230,386 B2
(45) Date of Patent: Jan. 25, 2022

(54) ELECTROMAGNETIC GYROSCOPIC STABILIZING PROPULSION SYSTEM METHOD AND APPARATUS

(71) Applicant: Airborne Motor Works Inc., Veradale, WA (US)

(72) Inventors: Jesse Antoine Marcel, Veradale, WA (US); Jeffrey Scott Chimenti, The Woodlands, TX (US)

(73) Assignee: Airborne Motor Works Inc., Veradale, WA (US)

( * ) Notice: Subject to any disclaimer, the term of this patent is extended or adjusted under 35 U.S.C. 154(b) by 226 days.

(21) Appl. No.: 16/550,891

(22) Filed: Aug. 26, 2019

(65) Prior Publication Data
US 2020/0140102 A1    May 7, 2020

Related U.S. Application Data

(60) Provisional application No. 62/722,968, filed on Aug. 26, 2018.

(51) Int. Cl.
*H02K 27/24*    (2006.01)
*B64D 27/24*    (2006.01)
(Continued)

(52) U.S. Cl.
CPC .............. *B64D 27/24* (2013.01); *B64C 17/06* (2013.01); *H02K 7/02* (2013.01); *H02K 7/088* (2013.01); *H02K 21/10* (2013.01)

(58) Field of Classification Search
CPC .......... B64C 17/06; B64D 27/24; H02K 7/02; H02K 7/088; H02K 21/10
(Continued)

(56) References Cited

U.S. PATENT DOCUMENTS

| 3,265,329 A | 8/1966 | Postelson(Apostolescu) |
| 3,327,538 A | 6/1967 | Krupick et al. |

(Continued)

FOREIGN PATENT DOCUMENTS

| CN | 104980001 | 10/2015 |
| JP | 3029792 | 2/2000 |

(Continued)

OTHER PUBLICATIONS

International Search Report and Written Opinion of the International Searching Authority completed Oct. 30, 2019, in International Patent Application No. PCT/US19/43995, 6 pages.

(Continued)

*Primary Examiner* — Tulsidas C Patel
*Assistant Examiner* — Rashad H Johnson
(74) *Attorney, Agent, or Firm* — Lowe Graham Jones PLLC

(57) ABSTRACT

Electromagnetic gyroscopic stabilizing propulsion system method and apparatus is an electric gyroscope that creates magnetic fields used to rotate its flywheel. The rotation of its flywheel creates both a gyroscopic effect and thrust with airfoil shaped spokes. The invention attaches to an airframe through an articulating joint that causes the axle of the gyroscope to precess in a vertical orientation regardless of the movements/angle of the airframe. The gyroscope's thrust aligns itself with the axle of the gyroscope. The net effect is that the invention has tremendous efficiency, no external drive because it is also a motor, tremendous power from magnetic leverage of the flywheel, and stability because of the gyroscopic effect.

5 Claims, 13 Drawing Sheets

(51) Int. Cl.
*B64C 17/06* (2006.01)
*H02K 21/10* (2006.01)
*H02K 7/08* (2006.01)
*H02K 7/02* (2006.01)

(58) Field of Classification Search
USPC ...... 310/74, 152, 153, 261.1, 262, 273, 420, 310/421, 424
See application file for complete search history.

(56) References Cited

U.S. PATENT DOCUMENTS

| | | | |
|---|---|---|---|
| 3,396,391 | A | 8/1968 | Anderson |
| 3,845,995 | A | 11/1974 | Wehde |
| 3,991,487 | A | 11/1976 | Bede |
| 4,953,811 | A | 9/1990 | Smith |
| 5,454,531 | A | 10/1995 | Melkuti |
| 5,514,923 | A | 5/1996 | Gossler et al. |
| 5,925,952 | A | 7/1999 | Bichler et al. |
| 6,270,038 | B1 | 8/2001 | Cycon et al. |
| 6,431,494 | B1 | 8/2002 | Kinkead et al. |
| 6,919,663 | B2 | 7/2005 | Iles-Klumpner |
| 7,032,861 | B2 | 4/2006 | Sanders, Jr. et al. |
| 7,152,301 | B2 | 12/2006 | Rittmeyer |
| 7,825,554 | B2 | 11/2010 | Bastian, II et al. |
| 7,874,513 | B1 | 1/2011 | Smith |
| 8,083,557 | B2 | 12/2011 | Sullivan |
| 8,752,787 | B2 | 6/2014 | Ruan et al. |
| 8,761,961 | B2 | 6/2014 | Lee et al. |
| 9,649,242 | B2 | 5/2017 | Chiu et al. |
| 10,040,544 | B2 | 8/2018 | Marcel |
| 10,144,507 | B2 | 12/2018 | Chretien |
| 10,676,180 | B2 | 6/2020 | Marcel |
| 2003/0085319 | A1 | 5/2003 | Wagner et al. |
| 2004/0020185 | A1* | 2/2004 | Brouillette ............... F02K 7/10 60/39.35 |
| 2004/0094662 | A1 | 5/2004 | Sanders, Jr. et al. |
| 2005/0269889 | A1* | 12/2005 | Tessier ............... E21B 43/126 310/166 |
| 2006/0016929 | A1 | 1/2006 | Mohr |
| 2006/0049304 | A1 | 3/2006 | Sanders, Jr. et al. |
| 2007/0188906 | A1* | 8/2007 | Ho ................... G11B 21/12 360/75 |
| 2008/0042504 | A1 | 2/2008 | Thibodeau et al. |
| 2010/0001143 | A1 | 1/2010 | Bojiuc |
| 2010/0090440 | A1* | 4/2010 | Reichstetter ............ B62M 1/10 280/293 |
| 2010/0307290 | A1* | 12/2010 | Porfiropoulos .......... F03G 3/00 74/84 R |
| 2011/0178711 | A1 | 7/2011 | Christoph |
| 2012/0056040 | A1 | 3/2012 | Brotherton-Ratcliffe et al. |
| 2013/0020429 | A1 | 1/2013 | Kroo |
| 2015/0149000 | A1 | 5/2015 | Rischmuller et al. |
| 2015/0188400 | A1* | 7/2015 | Kemp .................. H02K 53/00 310/74 |
| 2015/0209212 | A1 | 7/2015 | Duguid |
| 2015/0226086 | A1 | 8/2015 | Samuelson |
| 2016/0008206 | A1 | 1/2016 | Devanaboyina |
| 2016/0152327 | A1 | 6/2016 | Bertels |
| 2016/0207625 | A1 | 7/2016 | Judas et al. |
| 2017/0073065 | A1 | 3/2017 | Von Novak et al. |
| 2017/0104385 | A1 | 4/2017 | Salamon et al. |
| 2017/0320598 | A1 | 11/2017 | Bushroe |
| 2017/0335821 | A1 | 11/2017 | Ohya et al. |
| 2017/0361930 | A1 | 12/2017 | Choi et al. |
| 2019/0300165 | A1 | 10/2019 | Marcel et al. |
| 2020/0230013 | A1 | 7/2020 | Marcel et al. |

FOREIGN PATENT DOCUMENTS

| | | |
|---|---|---|
| RU | 2321765 | 4/2008 |
| RU | 2 527 248 | 8/2014 |
| RU | 2538737 | 8/2014 |
| SU | 1211449 | 2/1986 |
| WO | 2009/093181 | 7/2009 |
| WO | 2016/153580 | 9/2016 |
| WO | 2019/086293 | 5/2019 |
| WO | 2020023977 | 1/2020 |

OTHER PUBLICATIONS

International Search Report and Written Opinion of the International Searching Authority completed Apr. 17, 2020, in International Patent Application No. PCT/US2020/014491, 7 pages.

International Search Report and Written Opinion of the International Searching Authority completed Jun. 8, 2020, in International Patent Application No. PCT/US20/23676, 9 pages.

International Search Report and Written Opinion of the International Searching Authority completed Aug. 28, 2016, in International Patent Application No. PCT/US16/12073, 12 pages.

International Search Report and Written Opinion of the International Searching Authority completed Jul. 12, 2019, in International Patent Application No. PCT/US19/024696, 6 pages.

International Search Report and Written Opinion of the International Searching Authority completed May 12, 2020, in International Patent Application No. PCT/US2019/048191, 7 pages.

International Preliminary Report on Patentability dated Oct. 8, 2020, in International Patent Application No. PCT/US19/24696, 6 pages.

International Search Report and Written Opinion of the International Searching Authority dated Jun. 10, 2021, in International Patent Application No. PCT/US21/20174, 8 pages.

* cited by examiner

ELECTROMAGNETIC GYROSCOPIC STABILIZING PROPULSION SYSTEM METHOD AND APPARATUS

PRIORITY CLAIM

This application claims the benefit of priority from U.S. Provisional Patent Application No. 62/722,968 filed Aug. 26, 2018, the contents of which application is incorporated herein by reference in its entirety.

FIELD OF THE INVENTION

The invention relates to the field of electric propulsion systems used for propelling vertical takeoff and landing (VTOL) or very short takeoff and landing (VSTOL) air vehicles. More specifically, the invention comprises an electric gimbal mounted thrust producing gyroscope that is inherently stable and efficient when powering VTOL/VSTOL aircraft.

BACKGROUND OF THE INVENTION

There are several known electric aircraft propulsion systems. Most of these connect multiple electric motors to rotors/propellers that are rigidly mounted to their airframe. VTOL/VSTOL electric aircraft balance is enhanced by altering thrust between its motors/rotors. The motor's speed is controlled through avionics that include 3 axis accelerometers, magnetometers, and rate gyros.

Previously, electric propulsion systems used in airframes with VTOL/VSTOL capabilities were primarily used in unmanned aerial vehicles more commonly called quadcopters or multi-rotor drones. Because of advancements in battery technology allowing for greater energy density, larger electric motors with larger rotors/propellers can be used to create enough thrust to lift a pilot. The higher thrust propulsion system's motors consume energy at an extremely high rate where frequently the total thrust of the propulsion systems only slightly exceeds the overall weight of the aircraft and pilot. The low margin of thrust to weight necessitates exposed propellers/rotors. If a guard was placed above or below the propellers/rotors, overall thrust would be reduced so that the aircraft could not maintain reasonable flight times and may not create enough lift for take-off. Varying atmospheric conditions including wind, air temperature, and altitude can greatly affect the aircraft's ability to maintain stability, which further reduces flight time because the aircraft must fight to maintain control.

While advancements in batteries and avionics have created the opportunity for electric personal air vehicles (PAV's), the motors and rotors/propellers trail technologically behind these advancements. The present invention is directed to a novel self-driven propulsion system for PAV's that is powerful, compact, efficient, and self-stabilizing, and which greatly reduces or eliminates the fallibilities in existing technologies.

SUMMARY OF THE INVENTION

The present invention comprises a thrust-producing gimbal-mounted gyroscopic system for propelling VTOL and VSTOL capable electric PAV's. The invention is configured to be connected to an airframe in the position customarily occupied by a motor/propeller. The invention includes a rotating assembly consisting of a flywheel that produces thrust when rotated because its spokes have an airfoil cross-section with positive incidence. The flywheel is surrounded by permanent magnets adding an armature function to the freewheeling flywheel. Additionally, the magnets increase potential angular momentum strength because of the weight they add to the perimeter of the gyroscope flywheel.

In a preferred embodiment, a gimbal mount allows the flywheel to maintain a vertical orientation to the horizon due to the gyroscopic precession of the flywheel. Integrated into the gimbal is a stator with field coils that act upon the magnets surrounding the flywheel creating the drive.

In one embodiment, protective guards serve to both center the flywheel in the gimbal and keep the pilot and surroundings from accidentally coming into contact with the rotating assembly.

In one embodiment, controlling the field coils on the stator inside of the gimbal are individual microprocessors, one for each coil, allowing for unlimited switching of the motor's phasing.

BRIEF DESCRIPTION OF THE DRAWINGS

These and other features and advantages of the present invention will become more readily appreciated as the same becomes better understood by reference to the following detailed description when considered in connection with the accompanying drawings, wherein.

DETAILED DESCRIPTION OF THE PREFERRED EMBODIMENT

The terminology used herein is for describing particular embodiments only and is not intended to be limiting for the invention. As used herein, the term "and/or" includes any and all combinations of one or more of the associated listed items. As used herein, the singular forms "a," "an" and "the" are intended to include the plural forms as well as the singular forms, unless the context clearly indicates otherwise. It will be further understood that the terms "comprises" and/or "comprising" when used in this specification, specify the presence of stated features, steps, operations, elements, and/or components, but do not preclude the addition of one or more other features, steps, operations, elements, components, and/or groups thereof.

Unless otherwise defined, all terms used herein, including technical and scientific terms, used herein have the same meaning as commonly understood by one having ordinary skill in the art to which the invention belongs. It will be further understood that terms, such as those defined in commonly used dictionaries, should be interpreted as having a meaning that is consistent with their meaning in the one context of the relevant art and the present disclosure and will not be interpreted in an idealized or overly formal sense unless expressly so defined, herein.

In describing the invention, it will be understood that several techniques and steps are disclosed. Each of these has individual benefit and each can also be used in conjunction with one or more (or in some cases all) of the other disclosed techniques. Accordingly, for the sake of clarity, this description will refrain from repeating every possible combination of the individual steps in an unnecessary fashion. Nevertheless, the specification and claims should be read with the understanding that such combination are entirely within the scope of the invention and the claims.

New air vehicle gyroscopic propulsion system method and apparatus for creating a self-leveling, stable and efficient propulsion system are discussed herein. In the following description, for the purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

Figure 1:
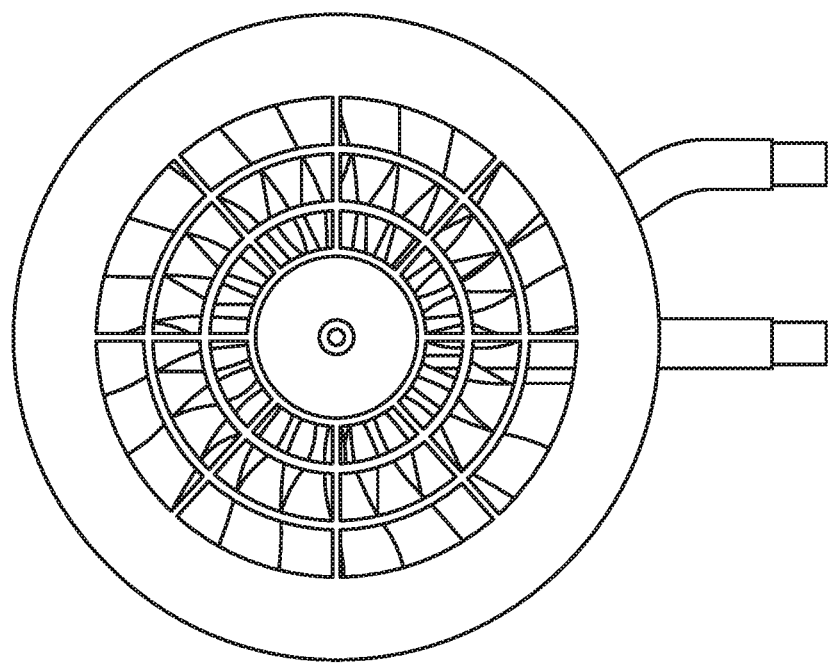
FIG. 1 is a top view showing the present invention.
Figure 2:
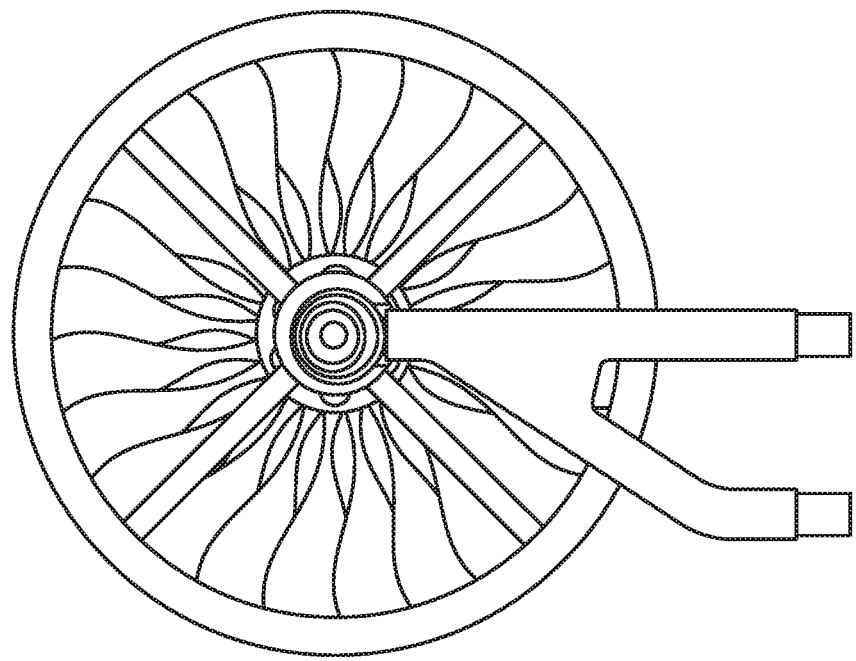
FIG. 2 illustrates a bottom view of the present invention.
Figure 3:
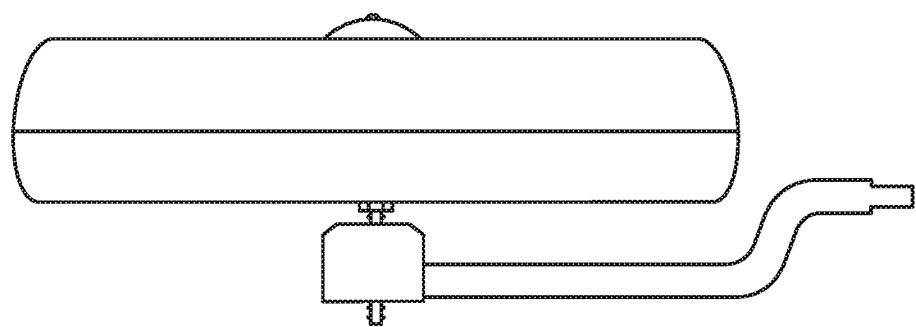
FIG. 3 presents a side view of the present invention.
Figure 4:
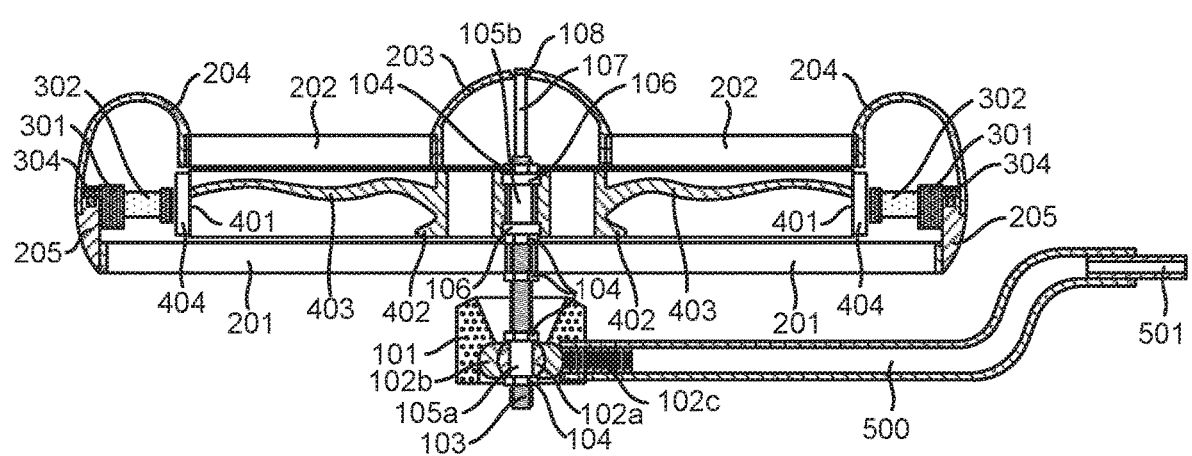
FIG. 4 presents a side cross-section view of the present invention.
Figure 5:
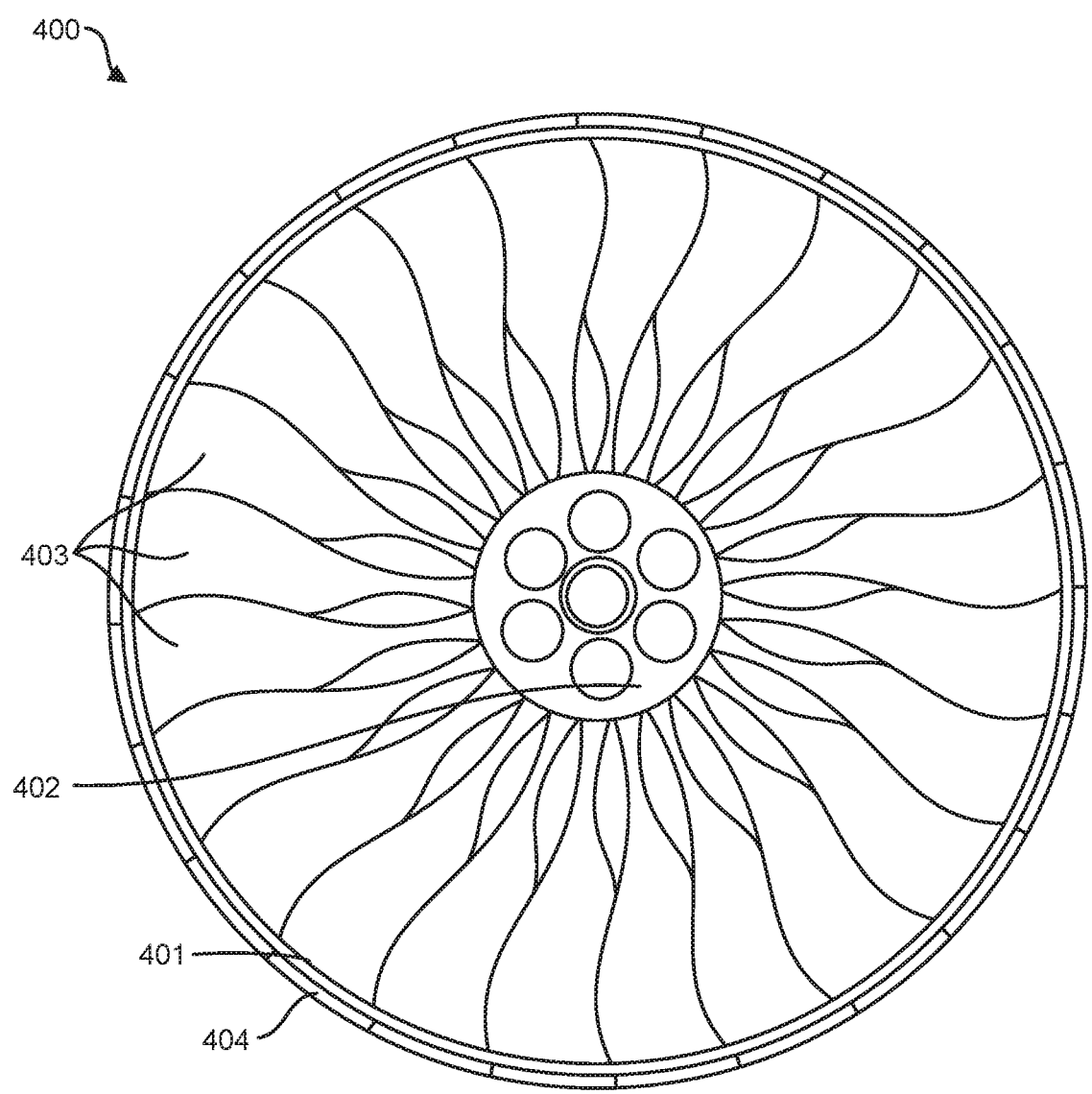
FIG. 5 presents a top view showing the invention's flywheel with attached magnets.

The present invention will now be described by referencing the appended figures representing preferred embodiments. FIG. 4 depicts a side cross-section view of elements that may comprise a self-driven air vehicle gyroscope propulsion system device (the "device") according to various embodiments of the present invention. In preferred embodiments, the general assembly FIG. 1 top, FIG. 2 bottom and FIG. 3 side contains each of the elements of the device configured with at least one central gyroscope flywheel 400, as shown in FIG. 5. As shown with reference to FIGS. 4 and 5, the flywheel 400 includes a perimeter ring 401, a central hub 402, and a plurality of spokes 403, which may be made of lightweight composite, aluminum, or another suitable material. The peripheral ring 401 is configured to accept a plurality of permanent magnets 404 along the flywheel's exterior perimeter. In some embodiments, vertical protrusions separate the magnets to split the surface area of the gyroscope's perimeter equally. The magnets, which may be made of neodymium or other suitable magnetic material, may be secured to the flywheel perimeter with appropriate adhesives or retaining structure. The magnets create the armature function of the flywheel in the drive.

The central hub 402 is configured to accept a plurality of roller bearings 106 to allow rotation about an axle 103. In an alternate embodiment, the flywheel is supported around its perimeter with intersecting bearings for a hub-less design. Thrust is created by the spokes 403 due to their airfoil cross-section with positive incidence causing directional airflow when the flywheel is rotated. In an alternate embodiment not shown, the spokes can be rotated either directly or by servomechanism about their longitudinal axis to increase or decrease the incidence of the spokes/blades to vary thrust without changing rotational speed. If the incidence angle is set to zero, the present invention stops producing thrust but keeps the gyroscopic effect for stabilization of connected structures.

In an alternate embodiment, the spokes and hub may be removed entirely when supported in a hub-less design. In this configuration the stabilizing system could be used as a belt component to help stabilize geriatric or disabled patients to prevent falls without the use of a vehicle. In addition, the stabilizing system could be used to stabilize any current non-airborne transportation or recreational vehicles. Further, the stabilizer system could be used to stabilize static structures including buildings. In this alternate embodiment, the articulating joint would be unnecessary with the gimbal having a rigid mount.

In an alternate embodiment the various parts of the flywheel including the rim 401, spokes/blades 403 and hub 402 can be composed of or impregnated with magnetic materials including composites. The configuration could concentrate the weight of the magnetic material near or at the outside edge of the parts for greater gyroscopic effect. When the spokes are magnetized, the perimeter rim can be eliminated in some designs.

Figure 6:
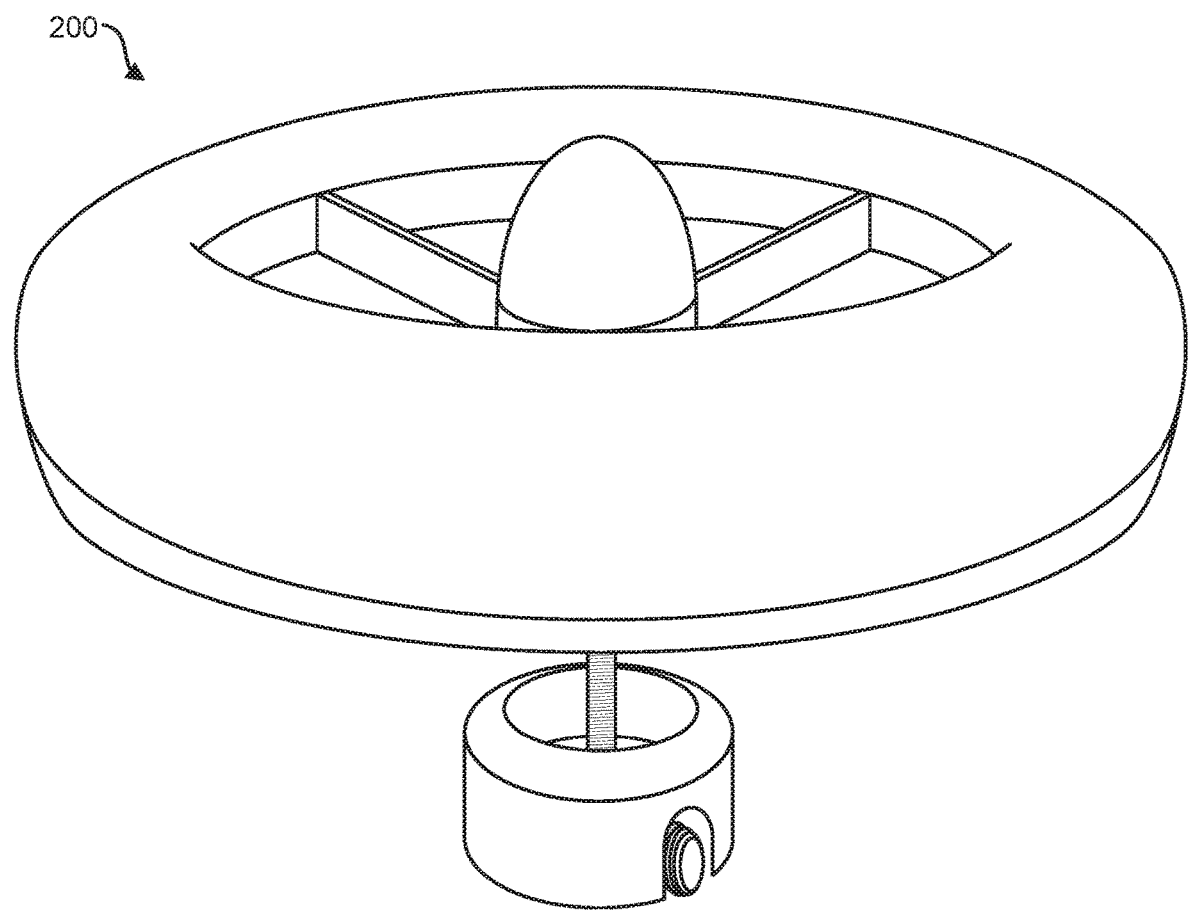
FIG. 6 illustrates a perspective view of the gimbal.
Figure 7:
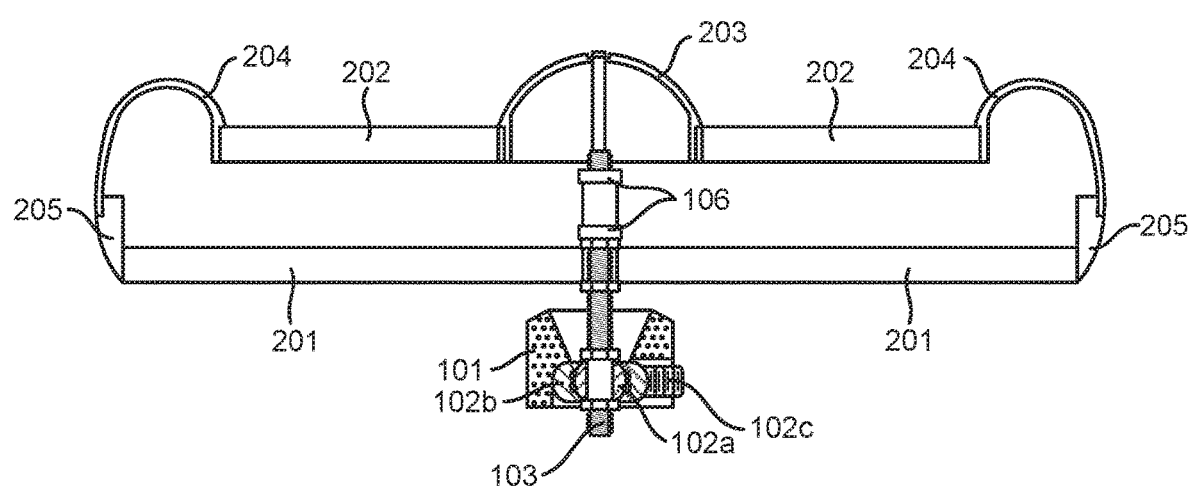
FIG. 7 presents a cross-section of the gimbal.
Figure 8:
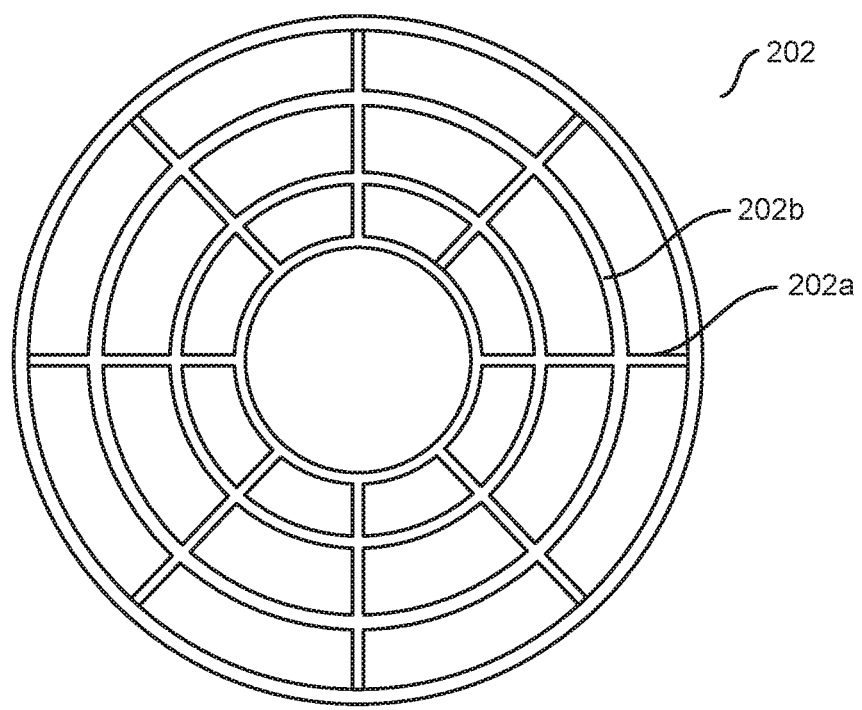
FIG. 8 is a top view of the upper guard in the gimbal.
Figure 9:
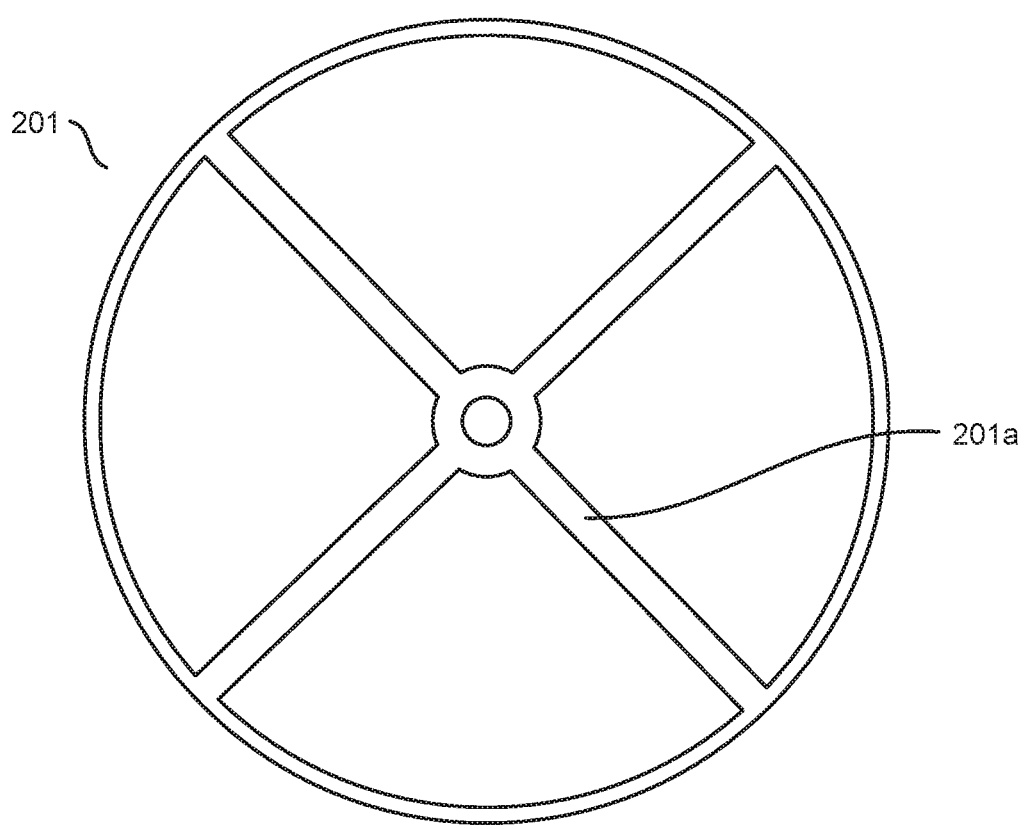
FIG. 9 is a top view of the lower guard in the gimbal.

As shown further with reference to FIGS. 6, 7 and 9, in a preferred embodiment of a gimbal assembly 200 of the present invention, the elements of the gimbal include a threaded gimbal axle 103 used to support the rigidly mounted components of the gimbal and roller bearings 106 that allow the flywheel 400 to freely rotate around the axle. An inner flywheel lower guard 201 integrates a plurality of spokes 201a used to support the hub 402. As shown with further reference to FIG. 8, an inner flywheel upper guard 202 integrates a plurality of spokes 202a and a plurality of hoops 202b, and when attached to a spinner 203 centers and supports the hub. The guards not only center and support the flywheel at its hub, they also serve as protection for the immediate environment surrounding the invention by shielding the spokes/blades 403. The perimeter of the upper and lower guards connects the upper perimeter section 204 and lower perimeter section 205 to form the gimbal body. The gimbal body upper section 204 with spinner 203 are preferably shaped to direct incoming airflow into the flywheel spokes/blades 403 creating additional lift. The gimbal aligns the gyroscope thrust with its precession allowing for a separation of the thrust vector from the aircrafts attitude for stability and ease of control of the VTOL/VSTOL personal air vehicle.

In an alternate embodiment, the inner flywheel guard upper 202 and inner flywheel guard lower 201 integrate the minimum spokes and hoops necessary to support the outer gimbal body and inner hub allowing greater exposure of the flywheel spokes/blades 403 to the immediate environment where the extra protection may not be necessary, for example in racing applications.

The gimbal may be constructed from lightweight composite materials, aluminum or any other suitable material.

Figure 12:
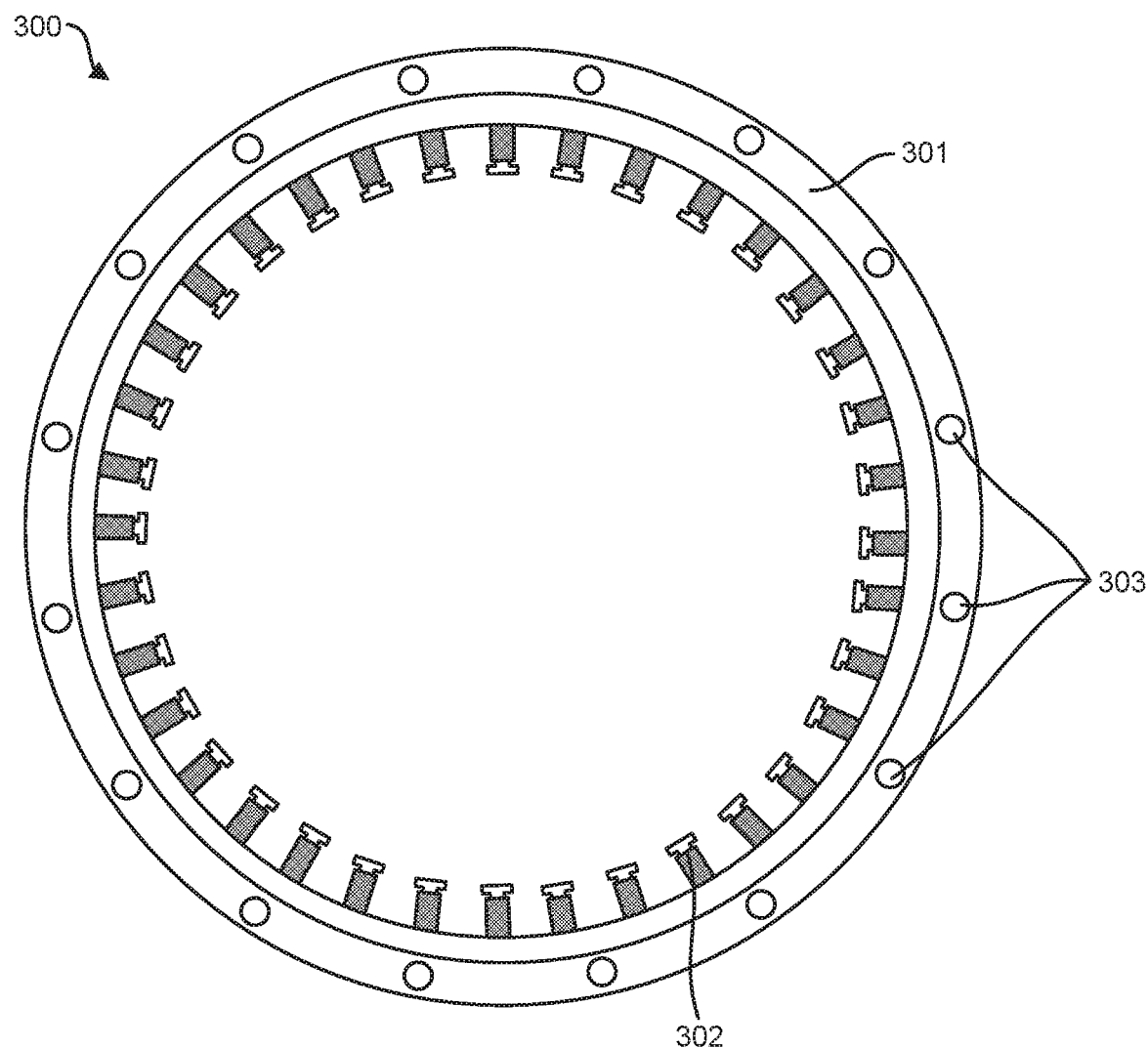
FIG. 12 is a top view of the stator assembly.
Figure 13:
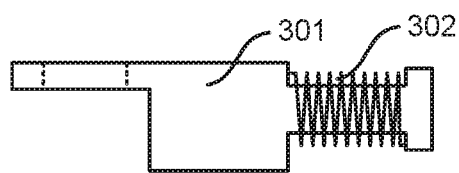
FIG. 13 is a section view of the stator assembly.
Figure 14:
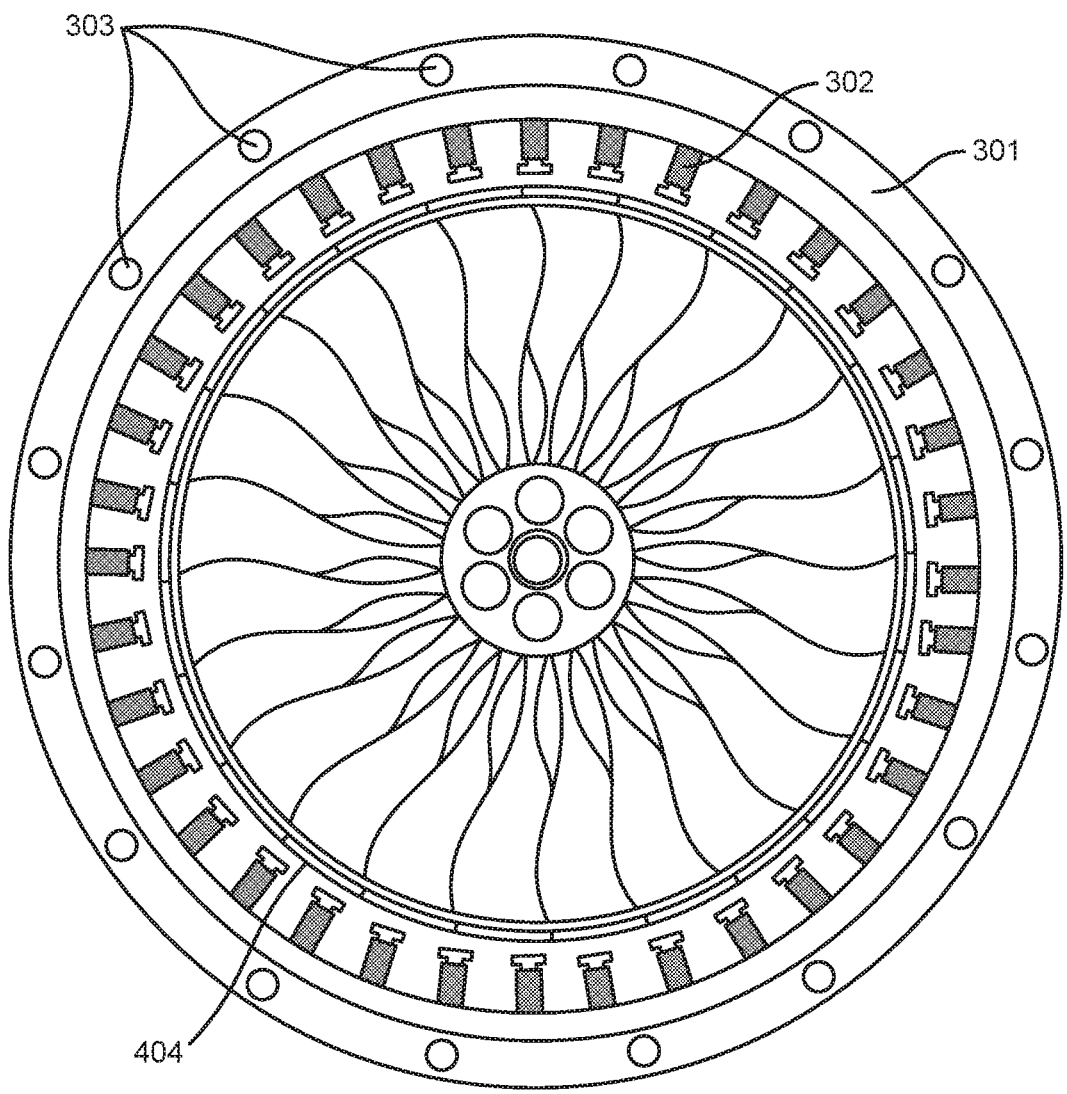
FIG. 14 illustrates a top view of a flywheel/armature and stator.
Figure 15:
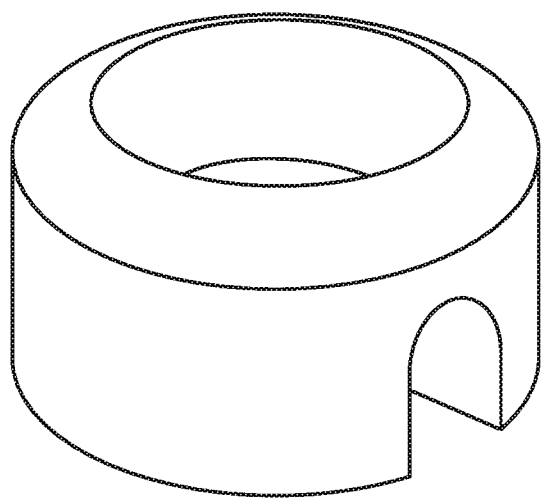
FIG. 15 presents a perspective view of a bump stop in the gimbal assembly.
Figure 16:
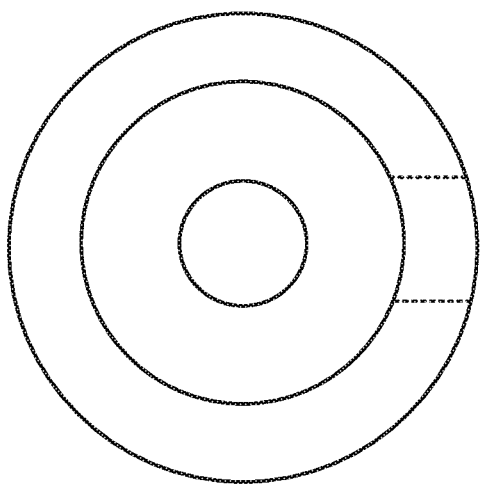
FIG. 16 depicts a top view of a bump stop in the gimbal assembly.
Figure 17:
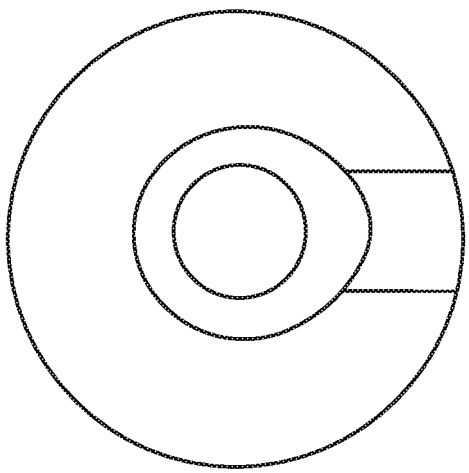
FIG. 17 illustrates a bottom view of a bump stop in the gimbal assembly.
Figure 18:
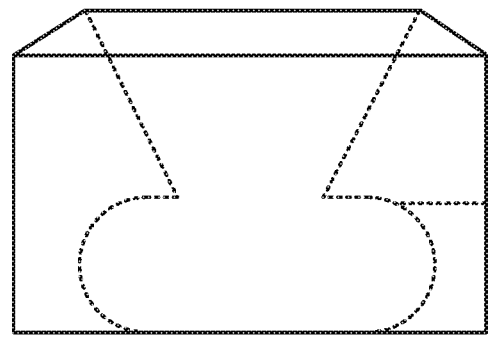
FIG. 18 is a cross-section view of a bump stop in the gimbal assembly.
Figure 19:
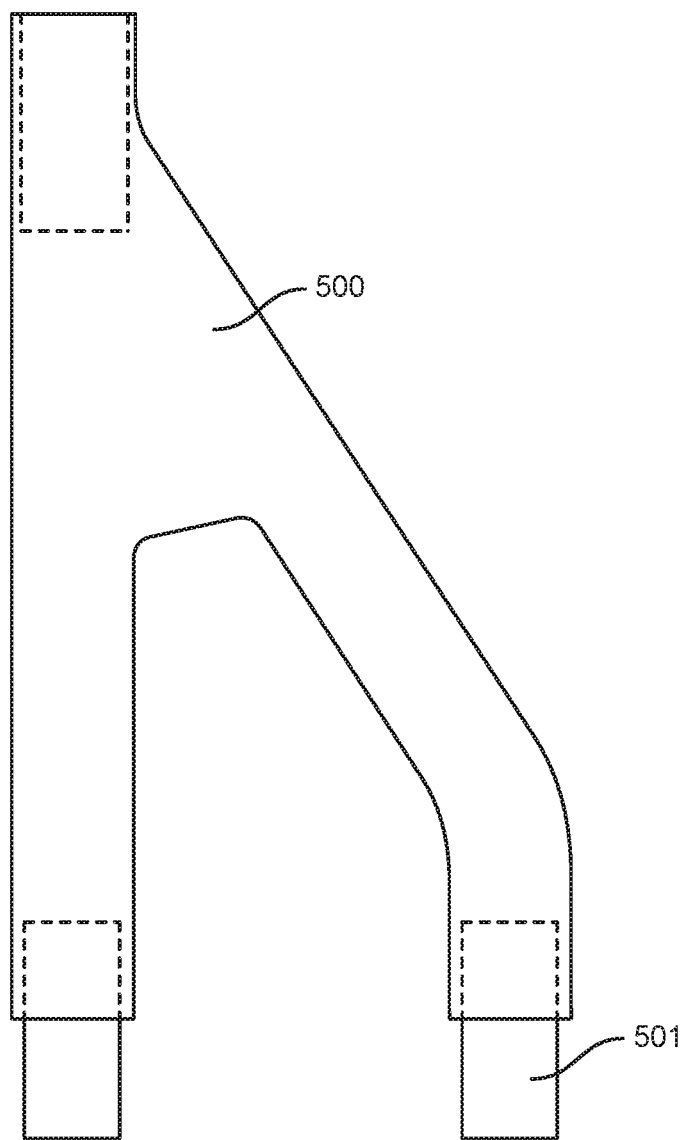
FIG. 19 is a top view of a suspension arm.
Figure 20:
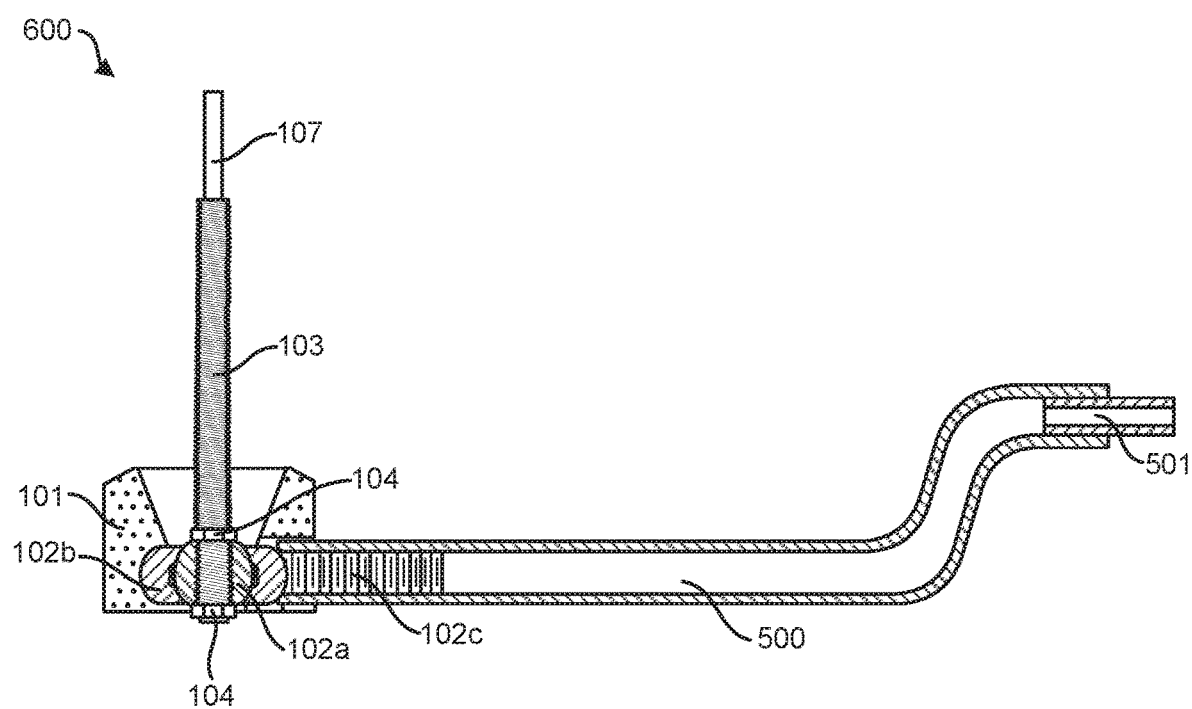
FIG. 20 is a cross-section view of the gimbal mount.

FIGS. 12, 13 and 14 show the elements that may comprise a stator assembly 300 located in the gimbal body according to various embodiments of the present invention. In preferred embodiments, the stator assembly includes a stator 301, which may be made from composite materials containing ferrous elements, iron or another suitable material, and field coils 302 that produce magnetic fields. As shown further with reference to FIG. 4, penetrations 303 enable hardware 304 to secure the stator assembly to the lower perimeter section 205, which hardware may include bolts, screws, rivets, or suitable bonding adhesive. Field coils 302 are individually controlled by microprocessors to create phasing magnetic fields that cause rotation of the flywheel/armature when acting upon its integrated permanent magnets 404. Because each of the field coils are controlled independently, phase changes can be made during the operation of the invention, for example from 3 to 4 phases based on the needs of the drive.

In an alternate embodiment, a single controller may be used to create either a 3 or 4 phase alternating current field.

In an alternate embodiment, by energizing a singular or proximate group of field coils, an imbalance could be created in the operation of the device that would yield a singular vectored force more commonly known as a bias drive. This bias drive force could be created with or without the thrust-producing spokes/blades of the flywheel. The bias drive configuration could be supported through a central hub or external bearings in a hub-less design.

In the preferred embodiment, regenerative coils may be located proximate to the field coils to add efficiency by harnessing unused magnetic energy created by the field coils and converting this into electrical energy that is circulated back to the batteries. These regenerative coils can be coiled around the field coils or bonded alongside of the field coils to create a two stranded field coil, one strand for energy input and a second strand for energy output, similar to the double helix of DNA. Another solution is to have the regenerative coils oriented in any location so that it can be affected by the field coil that creates a magnetic field.

In an alternate embodiment, all or some of the elements of the stator are encased in a resin matrix carbon fiber composite or similar material, allowing for the stator to be constructed as layers into innumerable shapes and sizes. The layers would integrate the various components either as solids or as particles in the resin matrix.

Figure 10:
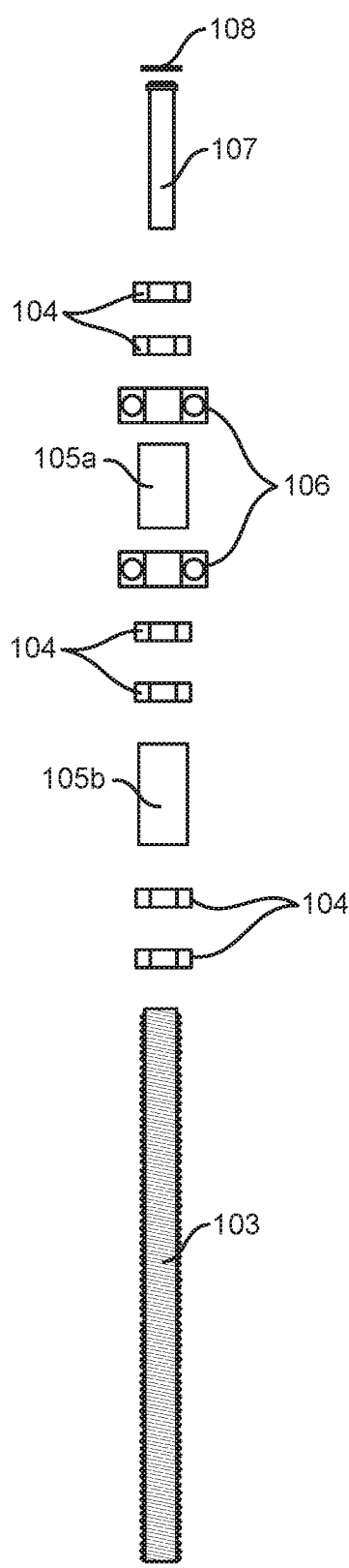
FIG. 10 depicts an exploded view of the axle.
Figure 11:
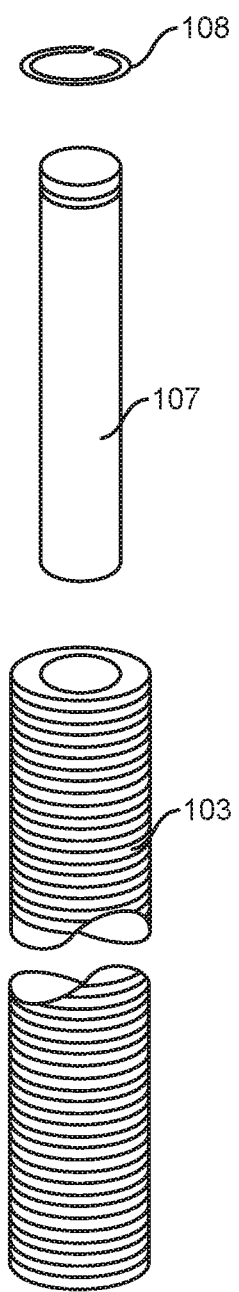
FIG. 11 depicts an exploded detail view of the spinner mount section of the axle.

An exploded view of a preferred axle assembly is shown with reference to FIGS. 10 and 11. The axle assembly is preferably made from lightweight composite materials, aluminum or any other suitable material, and the hardware that may be used to connect to the gimbal and rotor preferably includes bolts 104, lower tubular spacers 105a and upper tubular spacers 105b, roller bearings 106, nose cone support 107 and retainer circlip 108.

Various embodiments of the present invention are described with further reference to FIGS. 15-20. A gimbal mount 600 according to various embodiments of the present invention is shown. In preferred embodiments, threaded axle 103 connects the gimbal body to a joint ball swivel 102a that allows the gimbal to maintain the gyroscope's vertical orientation regardless of the orientation of the air frame. The joint ball swivel is preferably housed in a rigid casing that allows freedom of movement. Connecting the gimbal mount to the airframe is a suspension arm 500. The maximum angle between the gimbal and the airframe is controlled by a bump mount shown with reference to FIGS. 15-18, which is preferably made of rubber, composite, or another suitable material, and restricts movement based on inner cone dimensions.

By having the propulsion system mounted in a gimbal with the gimbal mounted to an articulated joint in a suspension arm that is further connected to a vehicle, for example a PAV, the angular momentum created by the gyroscopic propulsion causes the propulsion system to remain vertically oriented, which in turn causes the thrust to maintain a vertical orientation regardless of the orientation of the vehicle to which it is connected.

In an embodiment utilizing an articulated joint, the vertical orientation of the centralized axle that passes through the articulated joint may be tilted by servomechanism or by direct connection from a driver (not shown) that forces the propulsion system out of its most natural balanced state, which results in directional or vectored thrust.

To eliminate spin of the gimbal because of rotational torque, the articulating joint can be locked against rotation or elements can be added to the gimbal that would impact either the wing or mount (not shown) to eliminate this possibility.

In an alternate embodiment, the gimbal body is suspended from its perimeter rather than a central axle in a plurality of locations that allows the device to pivot and rotate in 360 degrees.

In an alternate embodiment, the invention is rigidly mounted to the airframe fixing its orientation to the airframe.

In an alternate embodiment, the electromagnetic gyroscopic stabilizing propulsion method and apparatus can be used to generate electricity when wind or water causes the un-powered flywheel to spin.

The embodiments of the invention in which an exclusive property or privilege is claimed are defined as follows:

1. A flywheel gyroscope gimbal, comprising:
   a perimeter section having an inside face and an outside face, wherein a plurality of magnets are positioned along the outside face;
   a hub section having an inside face and an outside face, comprising:
      an axle;
      a plurality of roller bearings configured to allow rotation of the hub section about the axle; and
      a plurality of spokes extending outward from the outside face of the hub section to connect to the inside face of the perimeter section, wherein the spokes are configured to produce thrust when rotated;
   a suspension arm, wherein the hub section is mounted to the suspension arm such that the thrust produced when the plurality of spokes are rotated causes the gimbal to remain vertically oriented, the suspension arm further comprising an articulated joint to which the axle is movably connected; and
   a drive configured to tilt the axle, which movement results in directional or vectored thrust from the plurality of spokes.

2. The flywheel gyroscope assembly of claim 1, further comprising a stator having a plurality of field coils along its inside diameter, wherein the plurality of interior field coils are positioned to act upon the magnets of the perimeter section to create rotation of the plurality of spokes to produce thrust.

3. The flywheel gyroscope assembly of claim 2, wherein the plurality of field coils are individually controlled by separate microprocessors.

4. The flywheel gyroscope assembly of claim 1, wherein the plurality of magnets is positioned to split the surface area of the perimeter section equally.

5. The flywheel gyroscope assembly of claim 1, further comprising upper and lower guards configured to center and support the flywheel at the hub section.

* * * * *